United States Patent [19]

Parker

[11] Patent Number: 5,145,687
[45] Date of Patent: Sep. 8, 1992

[54] COTTON CANDY MACHINE

[75] Inventor: Donald A. Parker, Springfield Township, Hamilton County, Ohio

[73] Assignee: Gold Medal Products Co., Cincinnati, Ohio

[21] Appl. No.: 101,568

[22] Filed: Sep. 28, 1987

[51] Int. Cl.5 ............................................. A23G 3/00
[52] U.S. Cl. .................................... 425/9; 425/131.5; 425/DIG.13
[58] Field of Search ......... 249/78; 264/338, DIG. 46; 425/8, 9, 131.5, DIG. 13

[56] References Cited

U.S. PATENT DOCUMENTS

| | | | |
|---|---|---|---|
| 3,036,532 | 5/1962 | Bowe | 425/9 |
| 3,073,262 | 1/1963 | Bowe | 425/9 |
| 3,118,396 | 1/1964 | Brown et al. | 425/9 |
| 3,279,394 | 10/1966 | Bowe | 425/9 |
| 4,360,328 | 11/1982 | Kassabian | 425/9 |

OTHER PUBLICATIONS

Lange et al. (Lange), *Handbook of Chemistry*, 7th Ed., Handbook Publishers, Inc., (1949), pp. 1542-1543.
Weast, *Handbook of Chemistry and Physics*, 49th Ed., The Chemical Rubber Co., (1968), p. E-63.
Kirk-Othmer, *Encyclopedia of Chemical Technology*, vol. 13, 3rd Ed., John Wiley and Sons, (1981), p. 562.
Encyclodpedia/Handbook of Materials, Parts and Finishes, pp. 169-173, 1976.

*Primary Examiner*—Charles Hart
*Attorney, Agent, or Firm*—Pearce & Schaeperklaus

[57] ABSTRACT

A spinner assembly for a cotton candy machine. The spinner assembly includes a tubular steel wall member having an upright wall provided with slots. A heater element is supported by the wall member in close proximity with the slots. The wall member is provided with a flame sprayed alumina coating which insulates the wall member from the heater element.

3 Claims, 2 Drawing Sheets

COTTON CANDY MACHINE

BACKGROUND OF THE INVENTION

This invention relates to a cotton candy machine. More particularly, this invention relates to an improvement in a cotton candy machine of the type shown in Bowe U.S. Pat. No. 3,036,532 and in Weiss application Ser. No. 07/029,278 filed Mar. 23, 1987, now U.S. Pat. No. 4,872,821 granted Oct. 10, 1989.

In Bowe, walls of a spinning head consist of short tubular slotted members which are porcelain coated to be electrical insulators. Heating elements are mounted in the tubular slotted members. The porcelain of such slotted porcelain coated members is prone to chip revealing underlying metal on which the porcelain is applied. An object of this invention is to provide a cotton candy machine in which slotted walls of a spinning head are formed of a sturdy metal covered with a dielectric thermospray oxide coating.

A further object of this invention is to provide a spinning head for a cotton candy machine in which slotted wall members are provided with a flame spray alumina dielectric coating.

SUMMARY OF THE INVENTION

Briefly, this invention provides a spinning head for a cotton candy machine which includes a slotted support wall of steel or the like for a heating element in which the wall is flame sprayed with powdered alumina to have a dielectric coating. The flame spray can be effected in a plasma flame. A spinning support for the wall and the heating element is provided. Flavored sugar or the like can be introduced into the head inside the wall.

The above and other objects and features of the invention will be apparent to those skilled in the art to which this invention pertains from the following detailed description and the drawings, in which:

BRIEF DESCRIPTION OF THE DRAWINGS

In the following detailed description and the drawings, like reference characters indicate like parts.

DESCRIPTION OF PRESENTLY PREFERRED EMBODIMENT

Figure 1:
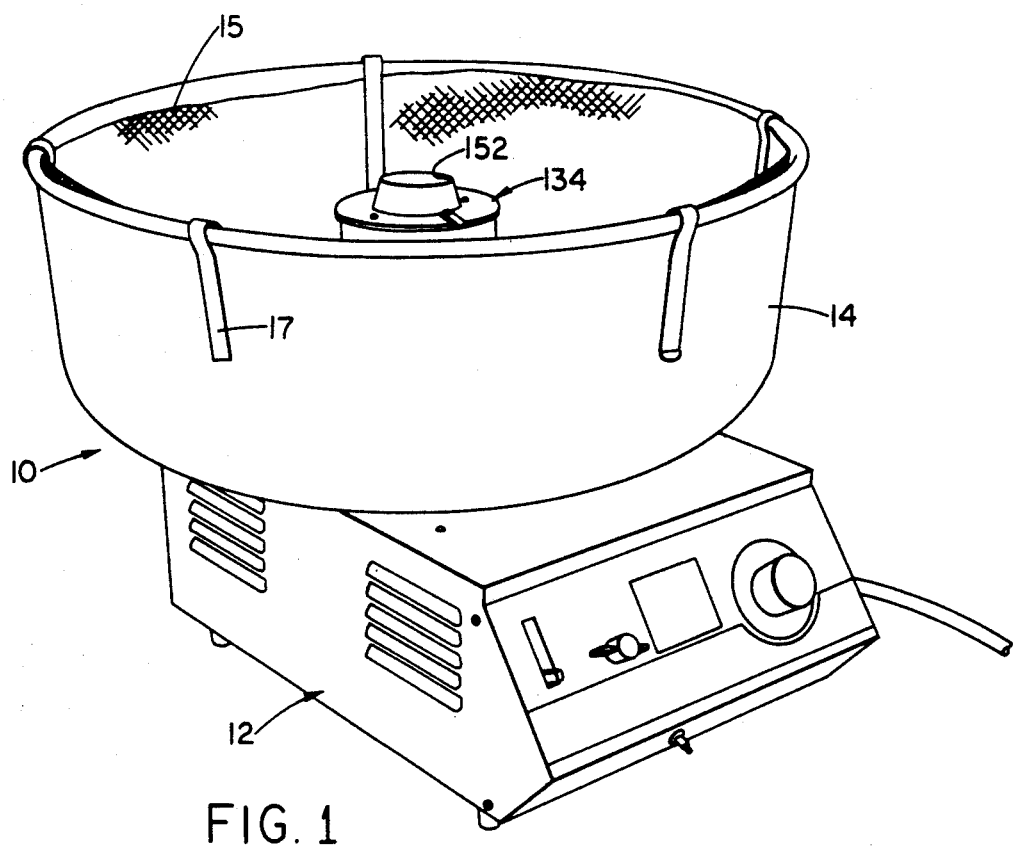
FIG. 1 is a perspective view of a cotton candy machine constructed in accordance with an embodiment of this invention.
Figure 2:
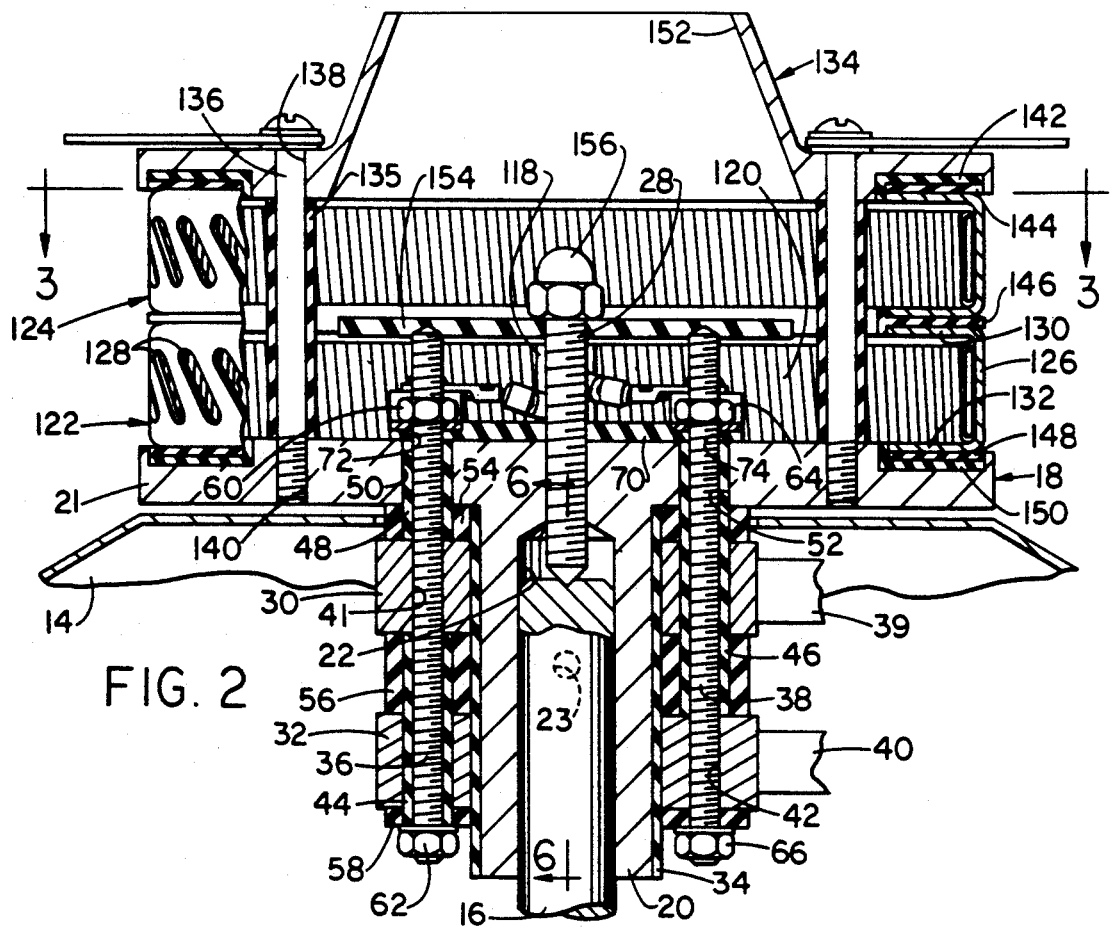
FIG. 2 is a fragmentary view in upright section of a spinning head of the machine.
Figure 3:
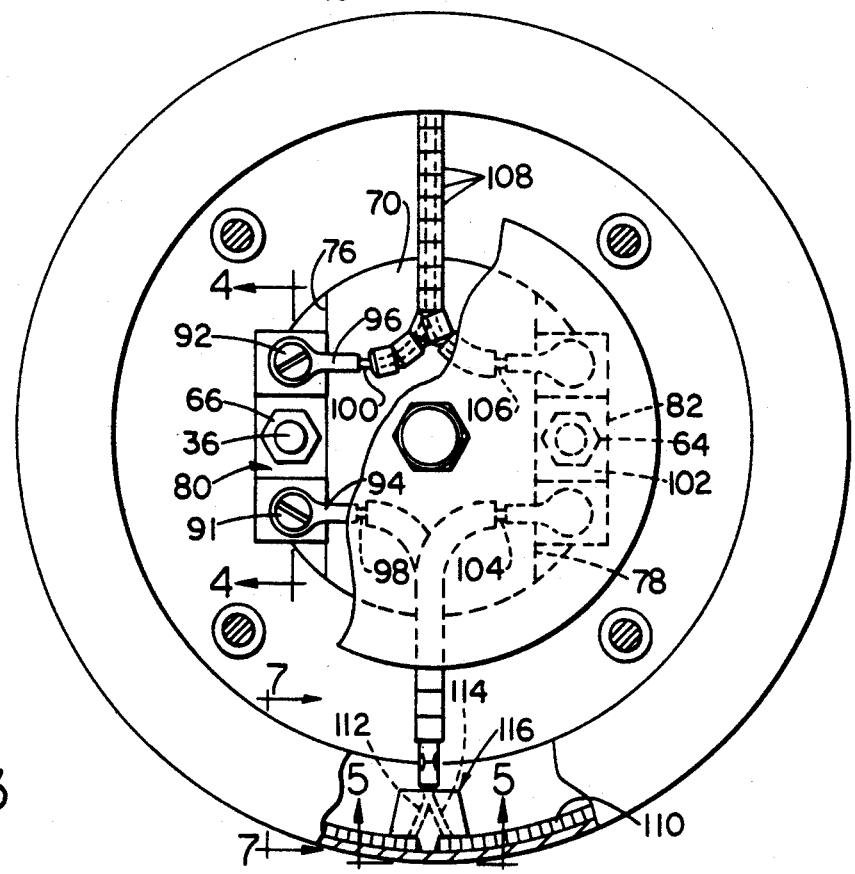
FIG. 3 is a view in section taken on the line 3—3 in FIG. 2.

In FIG. 1 is shown a cotton candy machine 10 constructed in accordance with an embodiment of this invention. The machine 10 includes a base 12 on which a basket 14 can be mounted. The basket 14 carries a mesh insert 15 supported by spring clips 17 for catching cotton candy (not shown) as the cotton candy is formed. A motor (not shown) in the base 12 drives an upright shaft 16 (FIG. 2). The shaft 16 supports a spinner head fitting 18. The spinner head 18 has an upright base or skirt portion 20 and an upper plate portion 21. The base 20 has an upright bore 22 in which the shaft 16 is received. A transverse threaded bore 23 in the base or skirt portion 20 of the spinner head 18 carries a set screw 26. The set screw 26 locks the shaft 16 in the upright bore 22. An upright jack screw 28 threaded in the spinner head 18 engages an upper end of the shaft 16 to support the spinner head 18.

Slip rings 30 and 32 are mounted on the skirt portion 20. A cylindrical sleeve insulator 34 separates the slip rings 30 and 32 from the skirt portion 20. The slip rings 30 and 32 are supported by slip ring studs 36 and 38, respectively. Appropriate brushes 39 and 40 run on the slip rings 30 and 32, respectively. The slip ring stud 36 is threaded in an upright opening 41 in the slip ring 30. The slip ring stud 38 is threaded in an opening 42 in the slip ring 32. A sleeve insulator 44 insulates the slip ring 32 from the slip ring stud 36. A sleeve insulator 46 insulates the slip ring 30 from the slip ring stud 38. A sleeve insulator 48 is disposed in an upright bore 50 in the plate portion 21 of the spinner head 18 to insulate the slip ring stud 36 from the spinner head 18. An upper portion of the sleeve insulator 46 is received in an upright bore 52 in the plate portion 21 to insulate the slip ring stud 38 from the plate portion 21. Insulator washers 54, 56 and 58 hold the slip rings 39 and 40 in spaced relation on the slip ring studs 36 and 38. Nuts 60 and 62 on the slip ring stud 36 and nuts 64 and 66 on the slip ring stud 38 hold the studs 36 and 38 in position with relation to the spinner head 18.

Figure 4:
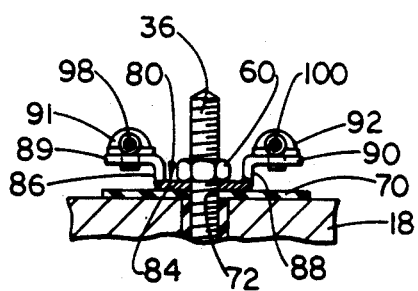
FIG. 4 is a view in section taken generally on the line 4—4 in FIG. 3.

An insulator disc 70 is mounted on the plate portion 21 of the spinner head 18 centrally thereof. The slip ring studs 36 and 38 extend through openings 72 and 74, respectively, in the disc 70. Slots 76 and 78 are formed in the disc 70. Terminal fittings 80 and 82 are mounted in the slots 76 and 78, respectively. Details of construction of the terminal fitting 80 are shown in FIG. 4. The terminal fitting 80 includes a central portion 84, which is held between the insulator disc 70 and the nut 60. The terminal fitting 80 also includes offset portions 86 and 88 and terminal portions 89 and 90. Screw fasteners 91 and 92 are supported on the terminal portions 89 and 90, respectively. The screw fasteners 91 and 92 attach terminal end portions 94 and 96 of lead wires 98 and 100, respectively, to the terminal fitting 80.

The terminal fitting 82 includes a central portion 102 which is held between the nut 64 and the insulator disc 70. Lead wires 104 and 106 are attached to the terminal fitting 82. The lead wires 98, 100, 104 and 106 are provided with tubular insulators 108.

Figure 5:
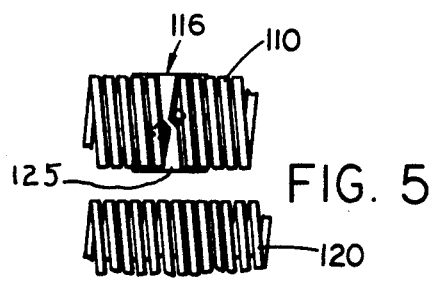
FIG. 5 is a view in section taken generally on the line 5—5 in FIG. 3.
Figure 7:
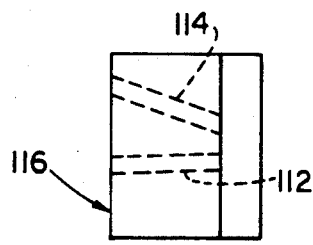
FIG. 7 is a view in side elevation of an insulator of the machine looking in the direction of the arrows 7—7 in FIG. 3.
Figure 6:
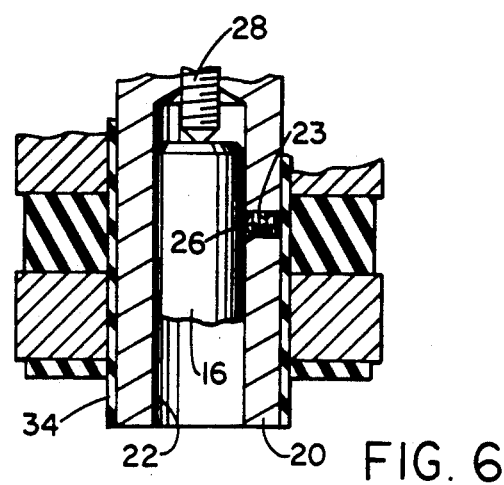
FIG. 6 is a view in section taken on the line 6—6 in FIG. 2.

End portions of the lead wires 98 and 104 are attached to end portions of a first heater element 110. The lead wires 98 and 104 extend through openings 112 and 114, respectively, in a first insulator 116. End portions of the lead wires 100 and 106 extend through openings in a second similar insulator 118 and are attached to ends of a second heater element 120. Each of the heater elements consists of a narrow ribbon of resistance wire wound in a flat coil which is curved to bear against the inner surface of one of a pair of wall members 122 and 124. As shown in FIG. 5, a rib 125 of the insulator 116 separates end portions of the first heater element 110. The second insulator 118 is similarly formed.

The heater elements 110 and 120 are supported by the wall members 122 and 124, respectively. The wall member 122 is generally channel shaped in section and includes a cylindrical face 126 provided with spaced slots 128. Upper and lower flanges 130 and 132 are provided at upper and lower edges of the wall face 126. The wall member 124 is of similar construction. The wall members 122 and 124 can be formed of steel or the like. Each of the wall members 122 and 124 is provided with a flame sprayed alumina coating which is dielectric in nature and is strongly resistant to chipping and the like. The coating can be formed with flame-spraying equipment or a plasma flame-spray gun. The coating is formed from finely divided alumina powder.

The wall members 122 and 124 are mounted between the spinner head 18 and a spinner cap 134. The spinner head 18 and the spinner cap 134 are drawn together by threaded fasteners 136, which extend through openings 138 in the spinner cap 134 and are threaded in openings 140 in the spinner cap 134. Insulator sleeves 135 are mounted on the fasteners 136 and limit movement of the spinner cap 134 toward the spinner head 18. Gaskets 142, 144, 146, 148 and 150 separate the wall members 122 and 124 from the spinner cap 134 and the spinner head 18 and from each other.

An opening 152 is provided in the center of the spinner cap 134 for entry of sugar. A disc 154 is mounted on upper ends of the slip ring studs 36 and 38 and is threaded on the jack screw 28. An acorn nut 156 threaded on the jack screw 28 steadies the disc 154.

when the cotton candy machine is in use, the shaft 16 is rotated to cause rotation of the spinner head 18 and associated elements including the disc 154, the heater elements 110 and 120 and the wall members 122 and 124. Sugar is poured slowly through the opening 152 and falls on the disc 154. Spinning of the disc 154 causes propelling of the sugar against the heater elements 110 and 120 where the sugar is melted. The melted sugar is projected through the slots 128 in the wall members 122 and 124 to form cotton candy which collects in the basket 14.

The cotton candy machine illustrated in the drawings and described above is subject to structural modification without departing from the spirit and scope of the appended claims.

Having described my invention, what I claim as new and desire to secure by Letters Patent is:

1. A spinner assembly for a cotton candy machine which comprises a tubular wall member having an upright wall provided with a plurality of slots, a tubular heater element supported by the wall member in close proximity with the slots, the wall member being of steel, and a dialectical flame sprayed coating on the wall member to insulate the wall member from the heater element.

2. A spinner assembly as in claim 1 in which the wall member includes inwardly extending flanges above and below the upright wall and the heater element is supported by the flanges.

3. A spinner assembly as in claim 1 in which the flame spray coating is formed of finely divided alumina.

* * * * *